(12) United States Patent
Zimmermann et al.

(10) Patent No.: US 9,157,507 B2
(45) Date of Patent: Oct. 13, 2015

(54) ASSEMBLY SET FOR A SERIES OF GEARED MOTORS

(75) Inventors: Heinrich Zimmermann, Bruchsal (DE); Michael Christ, Karlsdorf-Neuthard (DE); Roland Denefleh, Einhausen (DE); Jürgen Megerle, Forst (DE); Joachim Sander, Ubstadt-Welher (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 2000 days.

(21) Appl. No.: 10/547,398

(22) PCT Filed: Feb. 20, 2004

(86) PCT No.: PCT/EP2004/001659
§ 371 (c)(1),
(2), (4) Date: Aug. 29, 2005

(87) PCT Pub. No.: WO2004/077644
PCT Pub. Date: Sep. 10, 2004

(65) Prior Publication Data
US 2006/0194666 A1    Aug. 31, 2006

(30) Foreign Application Priority Data

Feb. 28, 2003 (DE) .................. 103 09 212
Mar. 22, 2003 (DE) .................. 103 12 941

(51) Int. Cl.
*H02K 7/116* (2006.01)
*F16H 1/12* (2006.01)
(Continued)

(52) U.S. Cl.
CPC .............. *F16H 1/125* (2013.01); *F16H 57/025* (2013.01); *F16H 57/033* (2013.01); *H02K 7/116* (2013.01); *F16H 2057/0335* (2013.01); *Y10T 74/19* (2015.01); *Y10T 74/19684* (2015.01)

(58) Field of Classification Search
CPC ..... F16H 1/125; F16H 57/033; F16H 57/025; F16H 2057/0335; H02K 7/116; Y10T 74/19; Y10T 74/19684
USPC .......................... 74/22 A, 330, 421 A, 421 R
See application file for complete search history.

(56) References Cited

U.S. PATENT DOCUMENTS 2,910,882 A    11/1959    Wellauer
3,434,366 A    3/1969    Raso et al.
(Continued)

FOREIGN PATENT DOCUMENTS

DE    23 47 523 B1    3/1975
DE    197 04 226    8/1988
(Continued)

OTHER PUBLICATIONS

International Preliminary Report on Patentability from PCT/EP2004/001659.
(Continued)

*Primary Examiner* — James Pilkington
(74) *Attorney, Agent, or Firm* — Kenyon & Kenyon

(57) ABSTRACT

A spare part set for a gearmotor series includes transmissions actuated by electric motors. The series has at least one dimension which may be characterized by at least one physical, mechanical and/or geometrical value, e.g., by nominal power, axis height or torque. Each electric motor includes at least one crankcase, a rotor provided with a rotor axis and a side-shield for a motor bearing arranged within a given size. The crankcase includes an interface with the side-shield for a motor bearing, which is selected such that at least two different embodiments thereof are connectable to the said crankcase.

40 Claims, 13 Drawing Sheets

(51) Int. Cl.
*F16H 57/025* (2012.01)
*F16H 57/033* (2012.01)

(56) References Cited

U.S. PATENT DOCUMENTS

| | | | |
|---|---|---|---|
| 3,959,990 | A | 6/1976 | Gölitz |
| 4,307,583 | A | 12/1981 | Hall |
| 5,375,479 | A * | 12/1994 | Kouno et al. .................. 74/420 |
| 5,651,747 | A * | 7/1997 | Minegishi et al. ............ 475/176 |
| 6,229,232 | B1 | 5/2001 | Roth-Stielow et al. |
| 6,234,037 | B1 * | 5/2001 | Zimmer .................... 74/421 A |
| 6,328,655 | B1 | 12/2001 | Zimmermann et al. |
| 6,869,378 | B2 | 3/2005 | Yamasaki et al. |
| 7,192,355 | B2 * | 3/2007 | Bayer et al. .................... 464/79 |
| 2003/0015054 | A1 | 1/2003 | Bouche |
| 2003/0176222 | A1 | 9/2003 | Zimmermann et al. |

FOREIGN PATENT DOCUMENTS

| | | |
|---|---|---|
| DE | 196 37 361 | 3/1998 |
| DE | 198 46 235 | 1/2001 |
| DE | 100 51 434 C2 | 4/2002 |
| DE | 100 61 501 C2 | 6/2002 |
| DE | 101 16 595 | 11/2002 |
| DE | 101 35 602 B4 | 4/2003 |
| EP | 0 557 961 | 9/1993 |
| EP | 0 567 048 A1 | 10/1993 |
| EP | 1 215 417 | 6/2002 |
| EP | 1 326 032 | 7/2003 |
| FR | 2 237 524 | 2/1975 |
| JP | 6-241284 | 8/1994 |
| JP | 2000-110895 | 4/2000 |
| WO | WO 99/06743 | 2/1999 |
| WO | WO02/23065 * | 3/2002 |
| WO | WO 02/23065 | 3/2002 |
| WO | WO02/084134 * | 10/2002 |

OTHER PUBLICATIONS

Patent Abstracts of Japan, vol. 2000, No. 07, Sep. 29, 2000.
Patent Abstracts of Japan, vol. 018, No. 628 (M-1713), Nov. 30, 1994.
"Servogetriebemotoren/Katalog 1051970X/DE", May 20002, SEW Eurodrive, XP002285254.

* cited by examiner

ASSEMBLY SET FOR A SERIES OF GEARED MOTORS

FIELD OF THE INVENTION

The present invention relates to an assembly set for a series of geared motors.

BACKGROUND INFORMATION

An inverter motor is described, for example, in German Published Patent Application No. 197 04 226, an inverter for supplying the motor with power being connected at the terminal box of the motor.

Geared motors include motors that are connected directly or indirectly to at least one gear unit.

German Published Patent Application No. 101 16 595 describes a series of geared motors, in which a motor shaft is connectable to a shank pinion or a plug-on pinion. However, an adapter is necessary for the plug-on pinion.

SUMMARY

An example embodiment of the present invention provides a modular system of geared motors.

According to an example embodiment of the present invention, an assembly set may provide that the drive-end motor bearing shield has an interface on the output side, such that (i) a lateral-force-free gear unit or
(ii) a gear unit not free of lateral force is directly connectable, the rotor shaft being connected non-positively, integrally and/or positively on the output side to a pinion,
the direct connection being implemented such that the pinion is provided as the input gearing part of the gear unit.

In this context, it may be provided that an interface is produced of the kind that direct mounting of a planetary gear unit or a gear unit having an input spur-gear stage is possible. The pinion may be implemented as a shank pinion and/or plug-on pinion, thereby making it possible to increase the range of gear ratios able to be covered by the assembly set considerably.

The pinion and rotor shaft may be in one piece, and therefore, no pinion may be necessary. In this manner, it may be possible to reduce the manufacturing tolerances.

The assembly set for a series of geared motors may include gear units driven by electric motors,
the series including at least one size able to be characterized by at least one physical, mechanical and/or geometrical variable, e.g., such as rated power output, shaft height or torque,
the electric motors each including at least a motor housing, a rotor including rotor shaft, and a drive-end motor bearing shield,
within one size, the motor housing having an interface to the motor bearing shield on the output side, such that at least two different variants of the output-side motor bearing shield are connectable to the motor housing,
the output-side bearing shield including a bearing for the rotor shaft,
(i) in a first variant, the drive-end motor bearing shield having an interface on the output side, such that the drive-end motor bearing shield is connectable to a flange of an adapter,
the adapter including a first adapter part and the adapter flange,
the assembly set including at least two types of the first adapter part connectable to the adapter flange, the interface between the adapter flange and the drive-end motor bearing shield of the first variant including a centering device,
the first adapter part of the first type
being connectable to a gear unit not free of lateral force, such as a gear unit with a helical-gear stage disposed on the input side, with the aid of an interface encompassing a two-dimensional, open fitting, thus, with the aid of an interface allowing shifts in a plane for setting the backlash of the gear unit not free of lateral force,
including an adapter shaft,
including at least two bearings and
having a first device for the compensation of axial expansions, e.g., thermally caused expansions,
the first adapter part of the second type
being connectable by an interface to a lateral-force-free gear unit, such as a planetary gear unit,
including an adapter shaft,
having a second device for the compensation of axial expansions, e.g., thermally caused expansions, and
including one bearing,
(ii) in a second variant, the drive-end motor bearing shield having an interface on the output side, such that a lateral-force-free gear unit, and alternatively, a gear unit not free of lateral force, is directly connectable,
in the second variant, it being possible to provide at least two types of rotor shafts when working with the same housing of the motor,
in the case of the rotor shaft of the first type, a plug-on pinion being provided on the output side and
in the case of the rotor shaft of the second type, a shank pinion being provided on the output side,
the direct connection being implemented such that the shank pinion or plug-on pinion is provided to mesh with at least one gearing part of the gear unit.

In this context, it may be provided that servo gear units, such as planetary gear units and other low-backlash gear units, are connectable to a motor either directly or via an adapter. Therefore, the unit volume, torsional rigidity and mass moment of inertia of the geared motor are also adaptable to the requirements of the specific application, without many parts being necessary, for in spite of the few parts included, the modular system may provide an extremely large variance within each size.

In an example embodiment, all the gear units have an open fitting as interface on the input side. This may provide that the pinion of the adapter shaft or rotor shaft to be introduced is radially displaceable together with the associated components, such that it is able to be brought to the desired position. In the case of the helical-gear stage, this means a possibility for adjusting the backlash, in the case of the planetary-gear stage, a centering of the sun wheel.

A bellows coupling may be provided as a first device for the compensation of axial expansions. Provided as a second device for the compensation of axial expansions may be at least one compensating disk, e.g., at a bearing of the adapter part. This may provide that it is possible to compensate for location and position deviations of the shafts, thus, the adapter shaft and the rotor shaft, and also for thermally caused expansions in a simple, cost-effective manner.

The gear units of the series may be designed to be low-backlash, such that, e.g., after adjusting the backlash with the aid of the displacements, the backlash on the whole may be less than 3 angular minutes per individual gear stage and/or gear unit. An advantage is that the gear units may be usable for servo technology.

The lateral-force-free gear unit connected to the adapter part and having a bearing arrangement on one side may encompass a higher air volume for the pressure equalization than the lateral-force-free gear unit having a bearing arrangement on both sides. Thermally caused air-pressure increases may be reducible, and therefore the danger of the gear unit becoming leaky may be decreased.

The gear unit may have a planetary-gear stage as input stage. This may provide that a servo gear unit free of lateral force on the input side and having a high gear ratio may be provided.

The gear unit not free of lateral force may be a double-stage gear unit whose gear stage situated on the input side is implemented as a spur-gear stage, e.g., having helical-toothed gear wheels. A high gear ratio may thus be attainable in the case of this double-stage gear unit, and the input spur-gear stage may be produced inexpensively.

The second stage of the gear unit not free of lateral force may be a right-angle gear stage. Not only colinear servo gear units, but also right-angle servo gear units may be produced using a small number of parts.

The right-angle gear unit may be arranged to be single-stage, e.g., as a hypoid gear unit. In this manner, a non-colinear gear unit having a high gear ratio may be produced within the series.

The gear units may be servo gear units, e.g., for exact positioning.

Further features and aspects hereof are described below.

LIST OF REFERENCE NUMERALS 1 motor housing
2 rotor with cylindrical shaft end
3 rotor with feather key for plug-on pinion
4 rotor for shank pinion
5 adapter part with two bearings
6 adapter part with one bearing
7 right-angle gear unit
8 planetary gear unit with cylindrical output-shaft end
9 planetary gear unit with flange block output
10 planetary gear preliminary stage
11 adapter flange
12 motor bearing shield with bearing
13 motor bearing shield with bearing
14 motor bearing shield with bearing
21 centering bore
22 rotor shaft
23 motor bearing shield
24 interface
25 bearing
26 shaft seal ring
31 plug-on pinion
32 rotor shaft
33 motor bearing shield
35 bearing
36 shaft seal ring
41 shank pinion
42 rotor shaft
45 bearing
46 shaft seal ring
50 gear-side coupling half
51 centering bore
52 adapter shaft
53 plug-on pinion
54 shaft seal ring
55 bearing
56 housing of the adapter part
57 bearing
58 motor-side coupling half
59 metal bellows
60 fastening screw
61 clamping ring
62 adapter flange
63 slit
64 housing of the adapter part
65 bearing
66 shaft seal ring
67 adapter shaft
68 centering bore
69 shank pinion
70 spur gear
71 bearing
72 pinion
73 crown-toothed wheel
74 open fitting
75 housing part
76 shaft
80 centering bore
81 planet-carrier shaft
82 shaft seal ring
83 bearing
84 bearing
85 needle bearing
86 planet wheel
87 planet spindle
88 spatial volume
89 clamping nut
90 bearing
91 planet spindle
92 planet wheel
93 housing
94 shaft seal ring
95 planet carrier
96 screw plug
97 spatial volume
98 needle bearing
121 asynchronous motor
122 synchronous motor with square flange
123 asynchronous motor as servo motor
124 inverter motor
125 series-connected gear unit
126 adapter
127 helical gear unit
128 parallel-shaft gear unit
129 helical-bevel gear unit
130 worm gear unit
131 spiroplan gear unit

DETAILED DESCRIPTION

Figure 10:
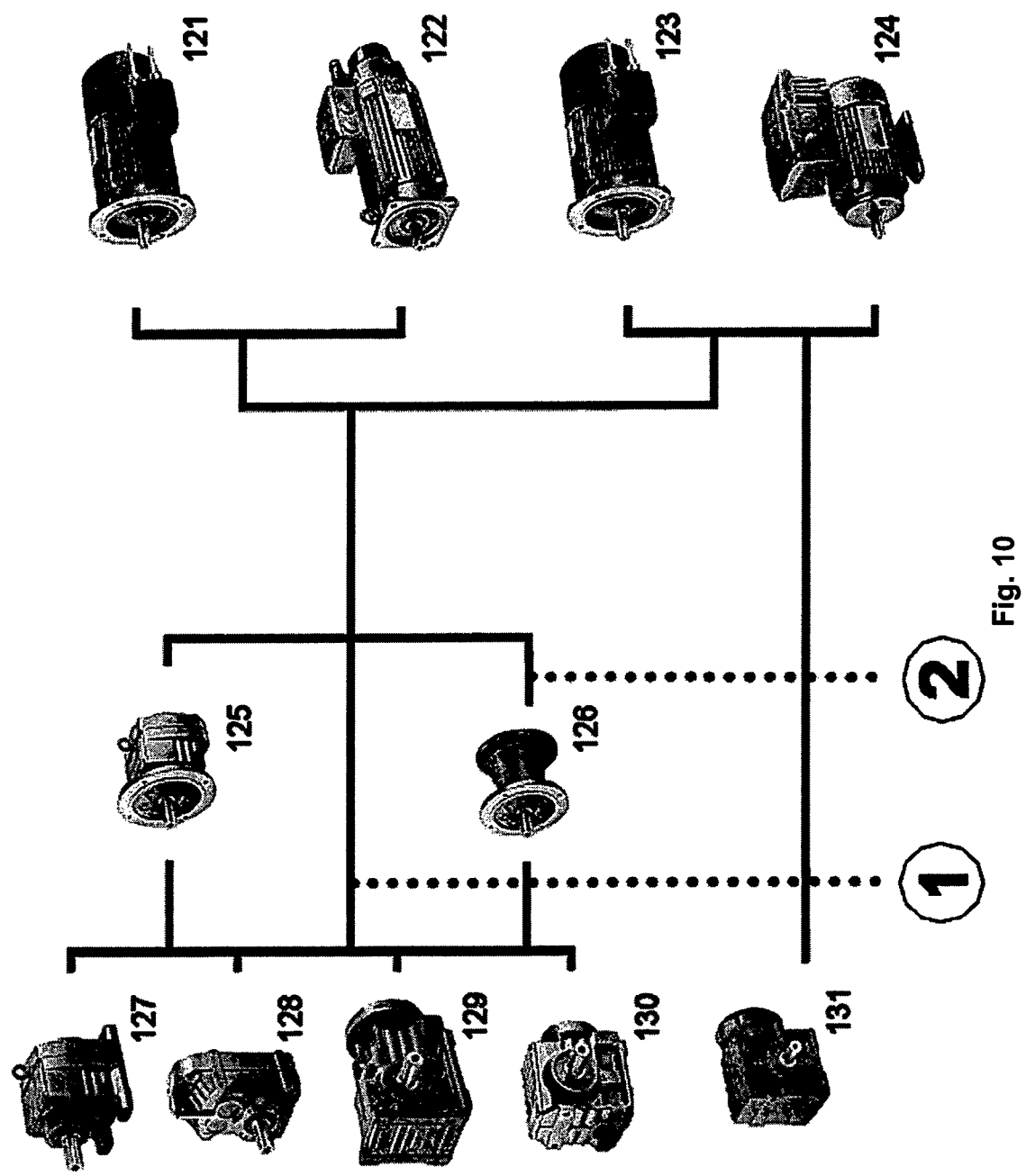
FIG. 10 illustrates a further part of the series, the components being illustrated in combination possibilities.

FIG. 10 illustrates combination possibility for a series of gear units. In this context, the assembly set for the series of geared motors is arranged such that different motors are connectable to different gear units, directly or with the aid of an adapter. The gear units illustrated in FIG. 10 do not have to be implemented as servo gear units.

Figure 1:
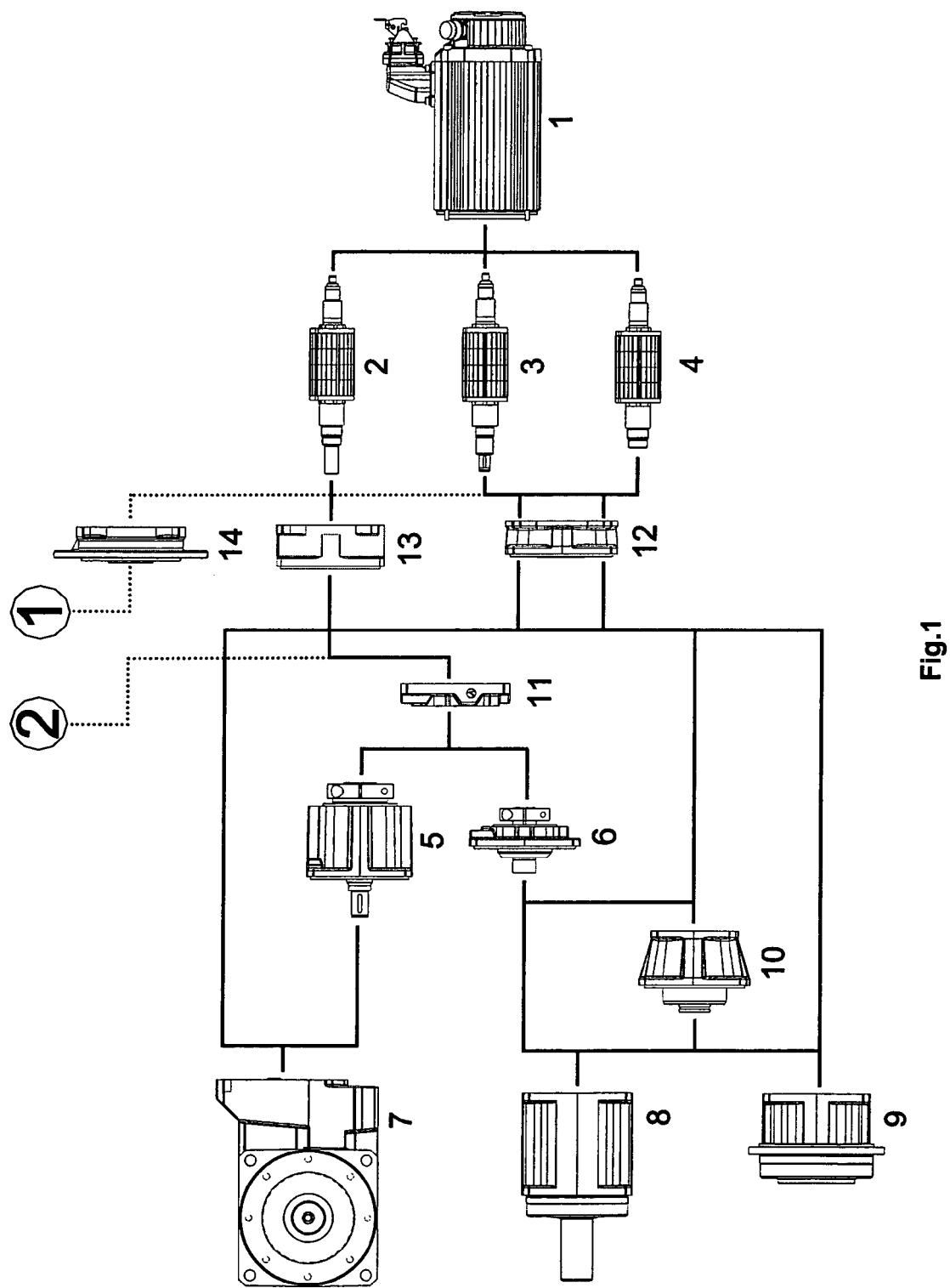
FIG. 1 illustrates a series part, the components being illustrated in combination possibilities.

FIG. 1 illustrates a part that is compatible with the series of geared motors, thus has corresponding interfaces. This part includes servo geared motors that are able to be assembled in various combinations. The gear units illustrated in this context and connectable to the motors are servo gear units.

This part illustrated in FIG. 1 is discussed first of all in the following:

The motor includes a motor housing 1 with stator. Depending on the requirement, an encoder and/or a brake is/are connectable on the non-drive end. On the drive end, the housing has an interface for connection to a motor bearing shield 12, 13, 14. The interface is formed by the drive-end geometrical formation of the motor housing and the positioning of the bores. The matching counter-interface is implemented in motor bearing shield 12, 13, 14. Thus, motor housing 1 is connectable to all motor bearing shields 12, 13, 14, each of which in turn differs at other points, however. The associated seats of the bearings and/or shaft-seal-ring seats may be implemented differently and/or different rotor shafts may be accommodated. Rotor 2, 3, 4, including in each case the rotor shaft, may be selected differently. A non-drive-end bearing of rotor 2, 3, 4 is encompassed by the motor housing. The further drive-end bearing is encompassed by the motor bearing shield.

Figure 2:
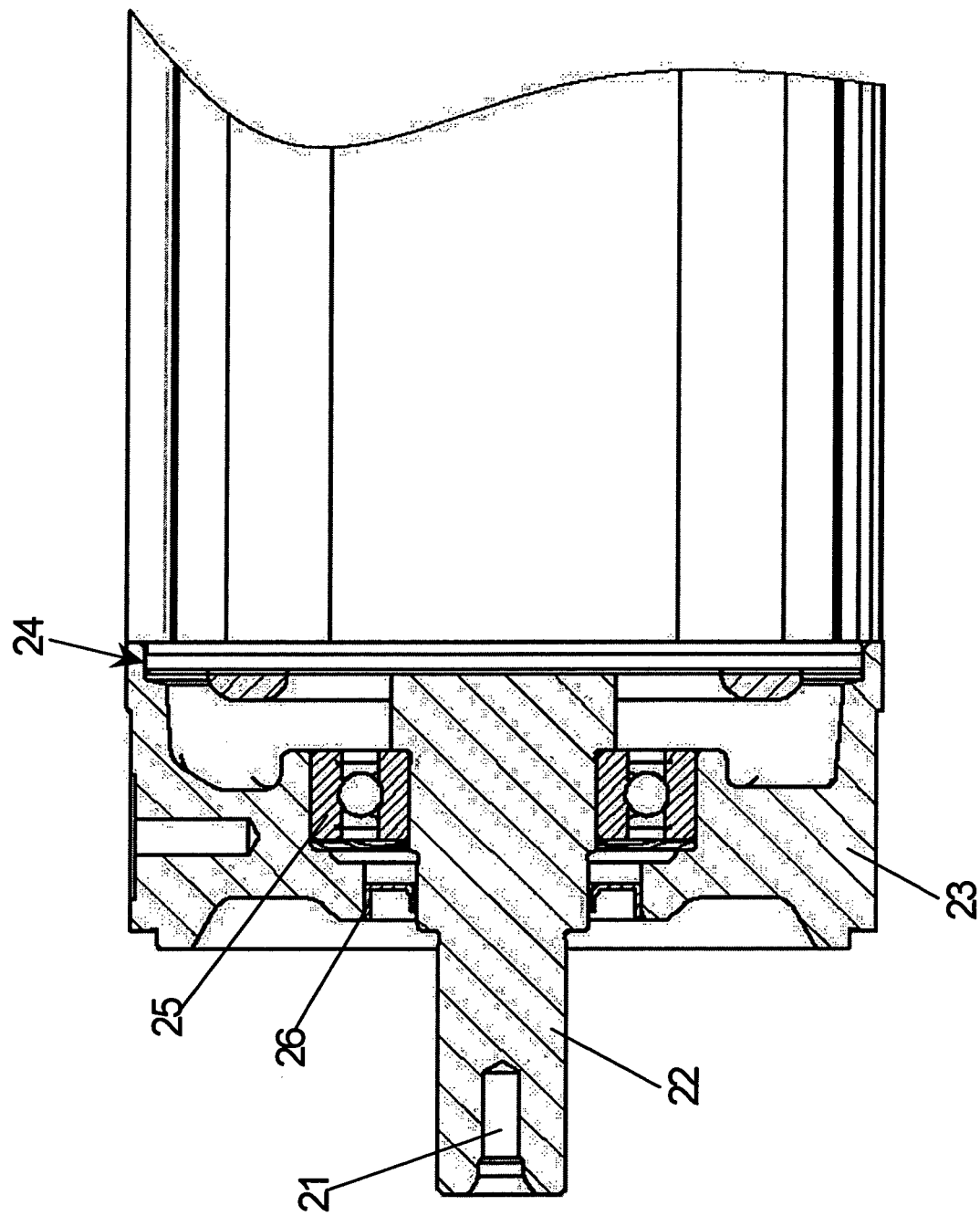
FIGS. 2 to 4 illustrate motor bearing shields 12 to 14 of the motors as individual parts.

Rotor 2 is implemented with a drive-end, cylindrical shaft end. This is also illustrated clearly in FIG. 2. In this context, rotor shaft 22 of rotor 2 also includes a centering bore 21. Motor bearing shield 23 includes a bearing seat for bearing 25 and a shaft-seal-ring seat for shaft seal ring 26. Interface 24 is implemented in the manner mentioned above in the case of the motor bearing shield and the motor housing.

Figure 3:
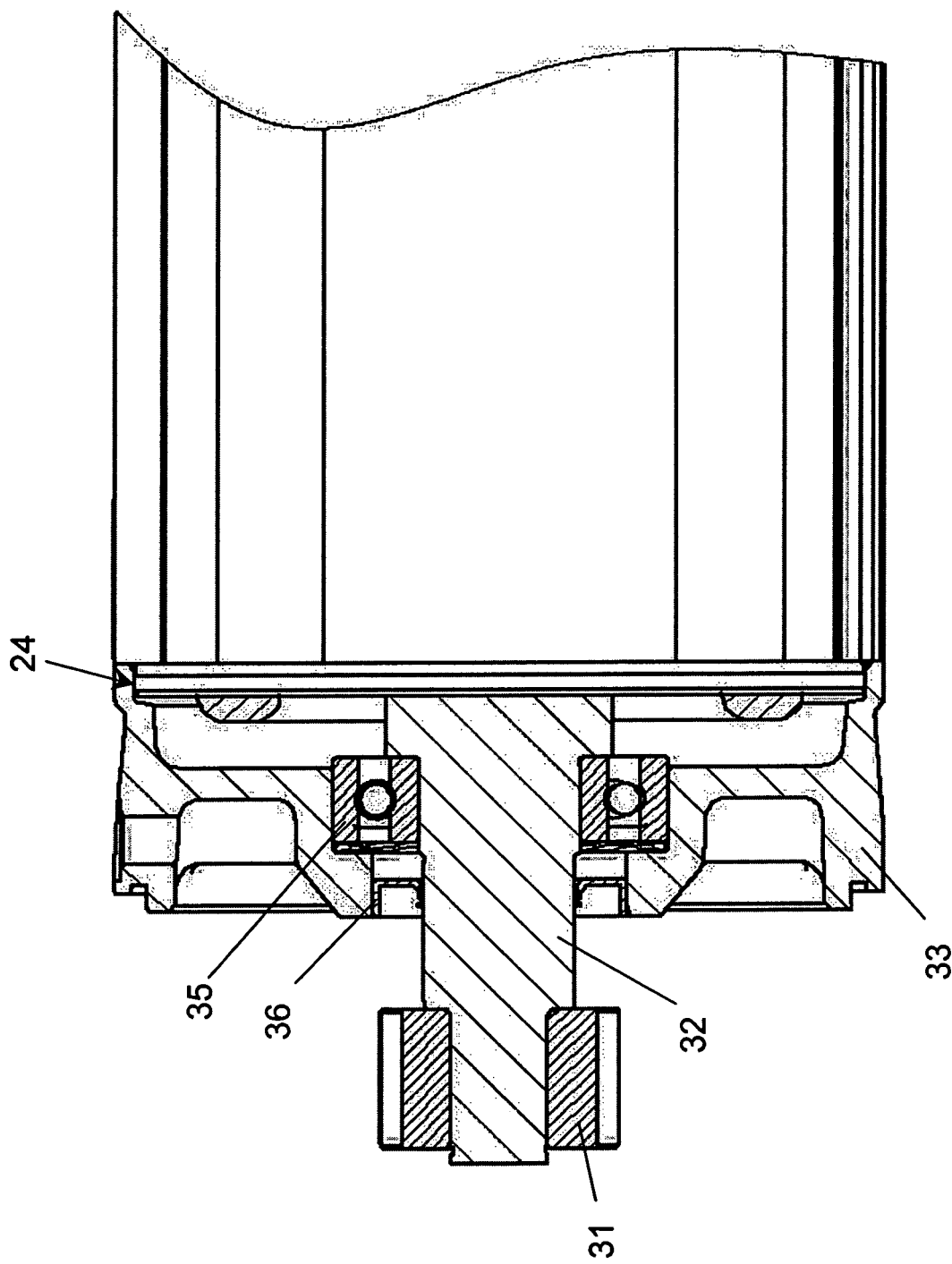

As illustrated in FIG. 3, rotor 3 is implemented with rotor shaft 32, rotor shaft 32 being supported by bearing 35 in motor bearing shield 33, which corresponds to motor bearing shield 12, and being sealed against it by shaft seal ring 36. Interface 24 of motor bearing shield 33 is implemented to match the same motor housing, as also in the case of FIG. 2. Rotor shaft 32 of rotor 3 is connected on the drive end by a feather key to a plug-on pinion 31.

Figure 4:
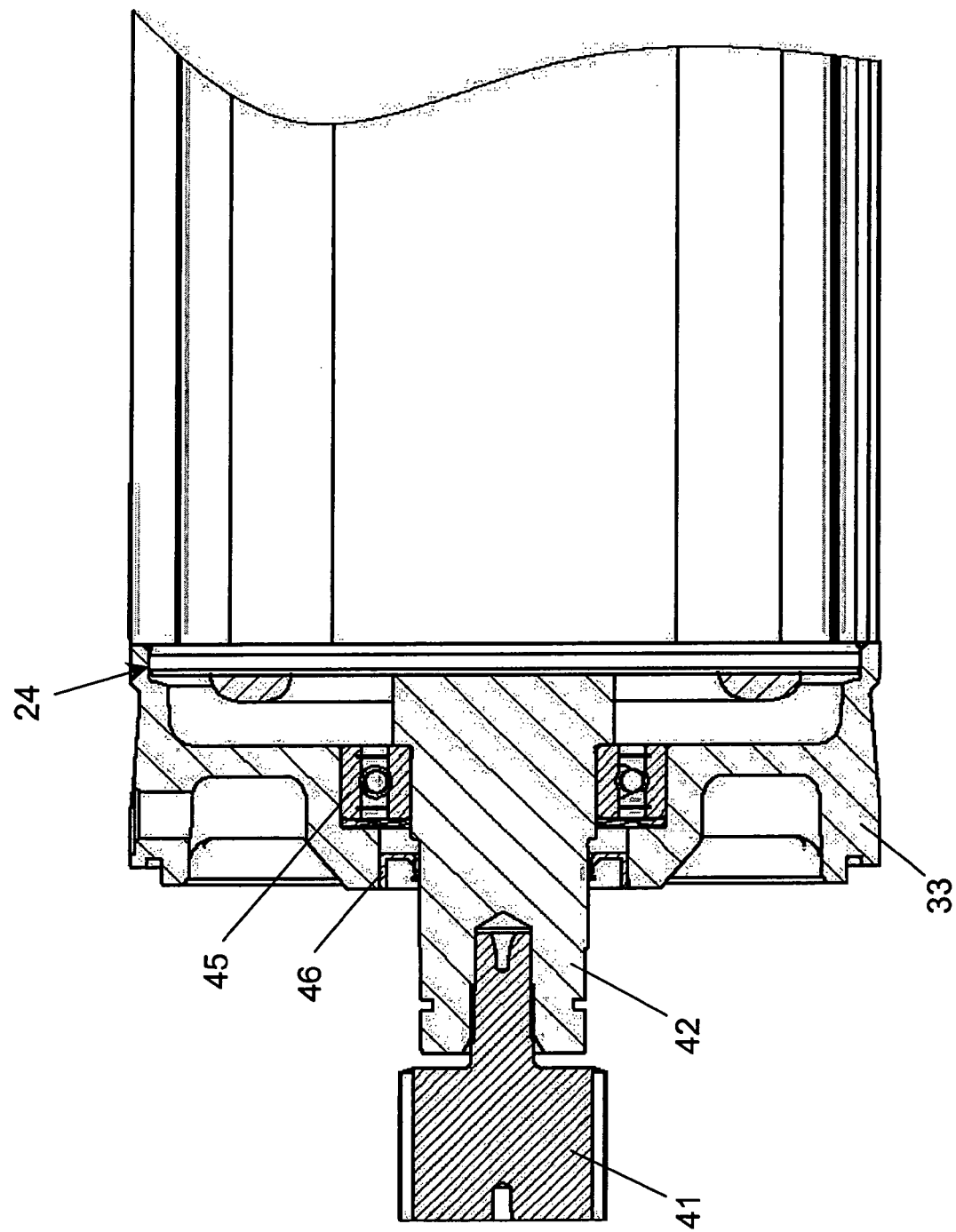

As illustrated in FIG. 4, rotor 4 is implemented with rotor shaft 42, rotor shaft 42 being supported by bearing 45 in motor bearing shield 33, which corresponds to motor bearing shield 12, and being sealed against it by shaft seal ring 46. Interface 24 of motor bearing shield 33 is implemented to match the same motor housing, as also in the case of FIG. 2. Rotor shaft 42 of rotor 4 is connected on the drive end to a shank pinion 41.

In further exemplary embodiments of the present invention, rotors 2, 3, 4 are practicable in different electromechanical variants, e.g., as rotor with short-circuit cage for forming an asynchronous motor, or as rotor with pasted-on magnets for forming a synchronous motor. However, further variants of motors, such as reluctance motors, direct-current motors or other electric motors, etc., are also usable. To that end, the interface and the rotor may be implemented to match accordingly.

Instead of motor bearing shield 12, motor bearing shield 14 is also usable with rotors 3 or 4, motor bearing shield 14 having the same interface 24 toward motor housing 1. The connection of all gear units 127, 128, 129, 130, which have a corresponding flange and are illustrated in FIG. 10, is permitted with the aid of this motor bearing shield 14. Gear units which, like right-angle gear unit 131, are arranged with a motor bearing shield integrated into the gear-unit housing, are not connectable. Only upon omission of indicated motor bearing shield 14, is it connectable.

In further exemplary embodiments of the present invention, each motor bearing shield may also be implemented as a square flange. Thus, further combination possibilities may be provided, with only a little more expenditure on components.

In the exemplary embodiment illustrated in FIG. 1, the motor formed with motor bearing shield 12 is connectable to a planetary gear unit with or without planetary-gear preliminary stage 10, or to a right-angle gear unit 7. In this context, the planetary gear unit is implemented as planetary gear unit 8 having a cylindrical output-shaft end, or as planetary gear unit 9 having a flange block output.

In the exemplary embodiment illustrated in FIG. 1, the motor formed with motor bearing shield 13 is connectable via the adapter, formed of adapter flange 11 and adapter part 6, to a planetary gear unit with or without planetary gear preliminary stage 10, or via the adapter formed of adapter flange 11 and adapter part 5, to right-angle gear unit 7. In this context, the planetary gear unit is implemented as planetary gear unit 8 having a cylindrical output-shaft end, or as planetary gear unit 9 having a flange block output.

Asynchronous motor 121 may be implemented as a standard motor in accordance with the IEC standard. However, further manufacturer-specific designs are also usable. One manufacturer-specific example embodiment is also illustrated in FIG. 1. Motor housing 1 is usable for various motors which differ due to motor bearing shield 12, 13, 14 and rotors 2, 3, 4. For example, a rotor 4 with shank pinion and a rotor 3 with plug-on pinion may also be provided. An extremely compact, direct mounting of one of gear units 7, 8, 9, 10 may thereby be feasible, and it may thus be possible to dispense with adapters etc. Since shank pinions and plug-on pinions are provided within the series modular system, a wide range of gear ratios is already attainable in the spur-gear stage disposed on the input side, the indicated pinion being the input gearing part of this spur-gear stage.

Synchronous motor 122 is arranged with a square flange, and is therefore connectable to corresponding components which have a matching interface. For example, adapter 126 or series-connected gear unit 125 are practicable on the motor side with such an interface. In the case of direct connection to the gear unit, gear unit 127, 128, 129 or 130 is also feasible with such a flange. As illustrated in FIG. 10, however, gear units 127, 128, 129 and 130, adapter 126 and series-connected gear unit 125 are implemented with a round flange. Not only asynchronous motor 121, but also asynchronous motor 123, implemented as a servo motor, or inverter motor 124 are connectable to the indicated round flanges Series-connected gear unit 125 includes a double-stage or triple-stage helical gear unit, and may be used for applications having a very high gear reduction.

Adapter 126 is connectable on the output side to gear unit 127, 128, 129 or 130. Therefore, the oil chamber of gear unit 127, 128, 129 or 130 may remain closed upon exchange of motor 121, 122, 123, 124 arranged at adapter 126 at the drive end.

Series-connected gear unit 125 and adapter 126 may also be provided with a square flange on the input side.

Parallel-shaft gear unit 128 and helical gear unit 127 each include two or three spur-gear stages. Helical-bevel gear unit 129 includes a spur-gear stage arranged on the input side and a bevel-gear stage disposed on the output side. Worm gear unit 130 includes a spur-gear stage arranged on the input side and a worm-gear stage disposed on the output side. Spiroplan gear unit 131 includes a spiroplan gear stage, thus, a right-angle gear stage.

A gear unit free of lateral force on the input side, e.g., planetary gear unit 8, 9, 10, may be connectable to a motor in the same manner as a gear unit not free of lateral force on the input side, e.g., a gear unit having a spur-gear stage disposed on the input side, like gear unit 7. The gear-side interface of the motor, or of the motor plus adapter, is thus identical for lateral-force-free gear units and gear units not free of lateral force.

The mass moment of inertia may be selectable, and therefore adaptable to the customer application, thus, the driven load. Thus, if a high mass moment of inertia is desired, and even a low torsional rigidity, a geared motor with adapter is selected, e.g., components 1, 2, 13, 11, 6, 8 or components 1, 2, 13, 11, 5, 7 illustrated in FIG. 1. A low torsional rigidity also means an, e.g., "smoother" drive; thus, sudden changes in torque of the geared motor are absorbed to a certain extent. If, on the other hand, a low mass moment of inertia and a high torsional rigidity are needed, a geared motor without adapter, thus, with motor connected directly to the gear unit, is selected, e.g., components 1, 3, 12, 7 or components 1, 3, 12, 8 or components 1, 4, 12, 9 illustrated in FIG. 1.

The gear units, e.g., gear units 7, 8, 9, 10, are designed with low backlash, e.g., with a backlash of less than 3 angular minutes per gear stage.

The motor-side interface of adapter flange 11 may be implemented with very little tolerance, thus highly precisely. Thus, the motor with its motor bearing shield 13 may be able to be disassembled very precisely. For example, the indicated interface may be implemented with less tolerance, thus, more precisely than the interface of the adapter toward the gear unit.

Figure 5:
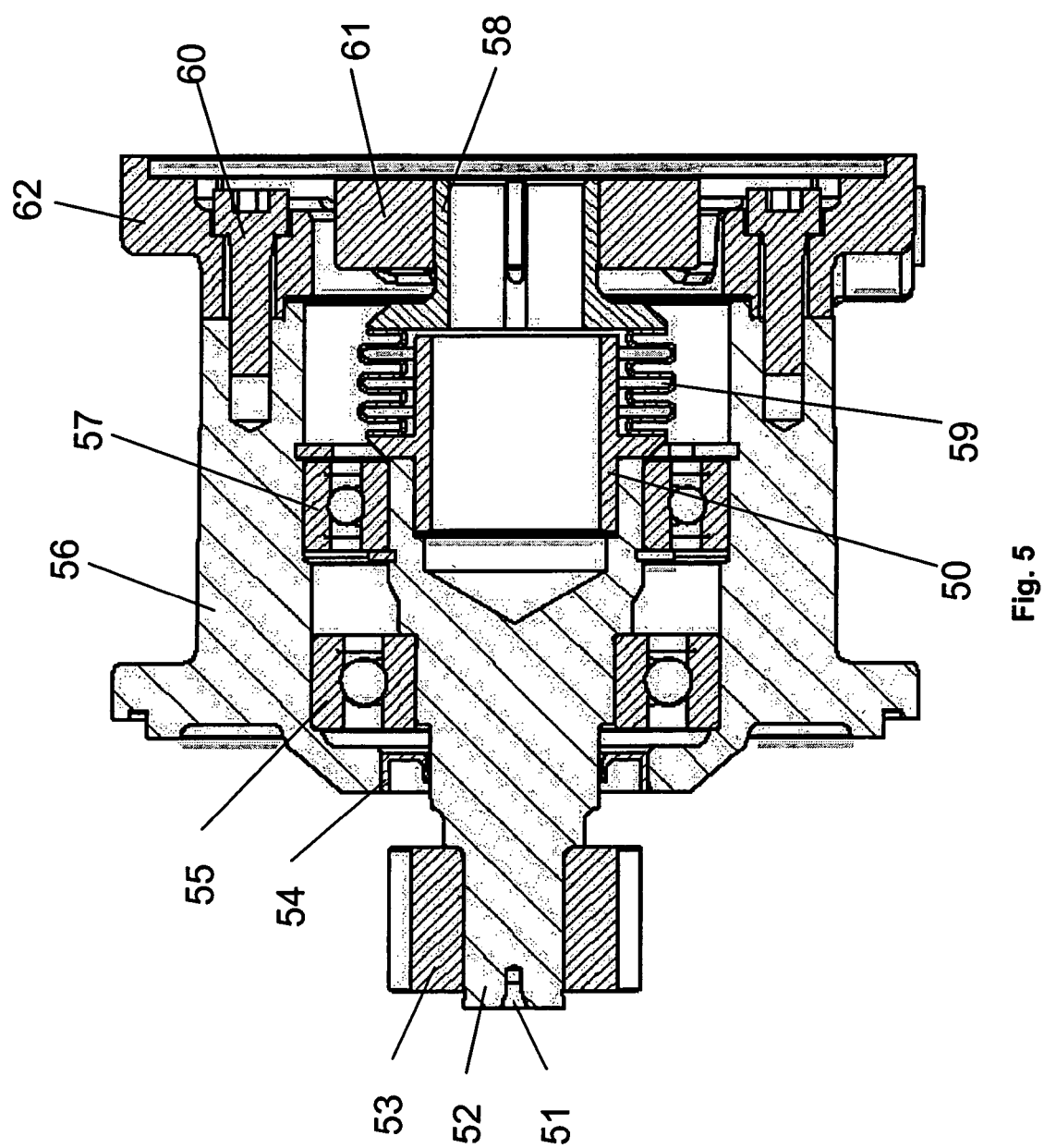
FIGS. 5 and 6 illustrate individual adapter parts 5, 6 and 11.
Figure 6:
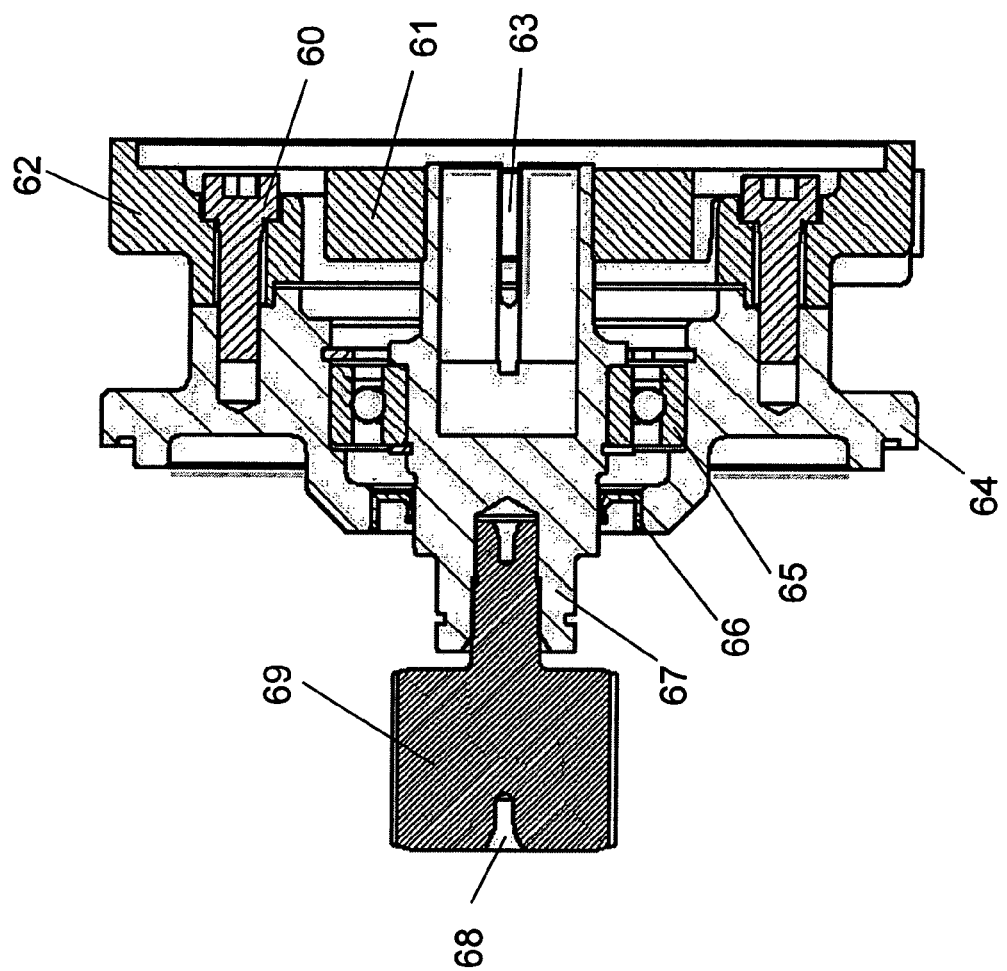

FIG. 5 is a sectional view of the adapter including adapter part 5 and adapter flange 11. FIG. 6 is a sectional view of the adapter including adapter part 6 and adapter flange 11. In common—and therefore reusable within the modular system—is adapter flange 62, which is connected to the housing of adapter part 5 or 6 by fastening screws 60.

As illustrated in FIG. 5, the cylindrical shaft end of rotor shaft 2 is connectable with the aid of clamping ring 61 to motor-side coupling half 58, which has a slit that may make the clamping effect of clamping ring 61 predictable and definable. Gear-side adapter shaft 52 of the adapter has a centering bore 51 and is connected to a plug-on pinion 53. Adapter shaft 52 is sealed by shaft seal ring 54 against housing 56 of adapter part 5, and is supported in it by bearings 55, 57, bearing 57 being sealingly implemented, and therefore a certain sealing of the lubricant, e.g., grease or semi-fluid grease, toward the motor being achieved. Toward the gear unit, e.g., toward its interior chamber having a different lubricant such as oil, etc., the sealing may be achieved by shaft seal ring 54. Between shaft seal ring 54 and bearing 55, an annular space is partially filled with lubricant, e.g., grease or semi-fluid grease, and thus a storage volume for lubricant may be provided.

Gear-side coupling half 50 is connected, e.g., positively, non-positively and/or integrally, to adapter shaft 52. The metal bellows is welded at its respective axial end areas to gear-side coupling half 50 and motor-side coupling half 58. It thus transmits the entire torque. The use of the adapter encompassing this metal bellows 59 thus may make available a geared motor having low torsional rigidity. Because of the large mass of the rotating parts, e.g., of the adapter, as well, this geared motor then also may exhibit a high moment of inertia or mass moment of inertia. The interface of the adapter toward the gear unit is implemented as a so-called open fitting, and therefore may allow small relative, radial displacements. Consequently, upon insertion of plug-on pinion 53 into gear unit 7, plug-on pinion 53 itself and adapter shaft 52, as well as housing 56 of adapter part 5 are fixed in that position and alignment predefined essentially by the position of the gearing parts of gear unit 7. Therefore, the gear unit is already adjustable during manufacturing, and the connection of the adapter may not disturb the adjustments of the gear unit. Compensation is thus made for small deviations caused by manufacturing, by shifting or rotating adapter shaft 52 in the space. The setting of the distance between axes, and thus also the backlash of the input spur-gear stage of gear unit 7 may be adjustable by radial shift of housing 56 toward the housing of gear unit 7. The indicated shifts are on the order of magnitude of one or several tenths. In this connection, the backlash is adjustable such that it may be less than 3 angular minutes.

On the other hand, adapter flange 62 has an interface toward the motor, such that the motor together with rotor shaft 2 may be exactly positioned upon being screwed onto adapter flange 62, i.e., the spatial position and alignment of motor bearing shield 13 with motor housing 1 and rotor shaft 2 is established by the screwing-on process. To that end, adapter flange 62 is provided at its interface with a fitting, and motor bearing shield 13 is provided with a corresponding formation. Metal bellows 59 accommodates radial and axial deviations from an ideal position.

The motor has components made of different materials. For example, the stator, e.g., also motor housing 1, is of aluminum, the rotor, e.g., the rotor shaft, of steel. Therefore, different thermal expansions may result, which also take effect in the direction of the adapter. To compensate for these expansions, motor-side coupling half 58 and gear-side coupling half 50 have an axial distance relative to each other of, for example, one or several millimeters. In response to thermally caused linear expansions of the rotor shaft, compensation is thus made possible by metal bellows 59.

As illustrated in FIG. 6, the cylindrical shaft end of rotor shaft 2 is connectable with the aid of clamping ring 61 to adapter shaft 67, which has a slit 63 that may make the clamping effect of clamping ring 61 predictable and definable. In addition, in the area of motor-side slit 63, adapter shaft 67 is implemented as a hollow shaft for the insertion of the rotor shaft. Adapter shaft 67 of the adapter is connected to a shank pinion 69 that has a centering bore 68. Adapter shaft 67 is sealed by shaft seal ring 66 against housing 64 of adapter part 6 and is supported in it by bearing 65. Bearing 65 is sealingly implemented toward the motor. Between shaft seal ring 66 and bearing 65, an annular space is partially filled with lubricant, e.g., grease or semi-fluid grease, and thus a storage volume for lubricant is provided.

Thus, the adapter illustrated in FIG. 6 may make available a geared motor having high torsional rigidity. Because of the smaller mass of the rotating parts, e.g., also of the adapter, in comparison to the adapter illustrated in FIG. 5, this geared motor may exhibit a low moment of inertia or mass moment of inertia. The interface of the adapter toward the gear unit is implemented as a so-called open fitting, and therefore may allow small relative, radial displacements. Therefore, upon insertion of plug-on pinion 69 into gear unit 8, 9 or 10, shank pinion 69 itself and adapter shaft 67, as well as housing 64 of adapter part 6 are fixed in the position and alignment essentially predefined by the position of the gearing parts of gear unit 8, 9 or 10, e.g., by the planets of the input planetary-gear stage of gear unit 8, 9 or 10. Consequently, the gear unit is already adjustable during manufacturing, and the connection of the adapter may not disturb the adjustments of the gear unit. Compensation is thus made for small deviations caused by manufacturing, by shifting or rotating adapter shaft 67 in the space. Because, for example, of the use of plug-on pinion 69 as sun wheel of the input stage of gear unit 8, 9 or 10, the spatial volume for movement of shank pinion 69 upon insertion into gear unit 8, 9 or 10 may be sharply limited. However, the open fitting may permit the exact final position of the housing of adapter part 6 and of the housing of gear unit 8, 9 or 10 relative to each other to adapt to the position of the sun wheel predefined by that of the planets.

On the other hand, adapter flange 62 has an interface toward the motor, such that the motor together with rotor shaft 2 may be exactly positioned upon being screwed onto adapter flange 62, i.e., the spatial position and alignment of motor bearing shield 13 with motor housing 1 and rotor shaft 2 is established by the screwing-on process. To that end, adapter flange 62 is provided at its interface with a fitting, and motor bearing shield 13 is provided with a corresponding formation.

Figure 12:
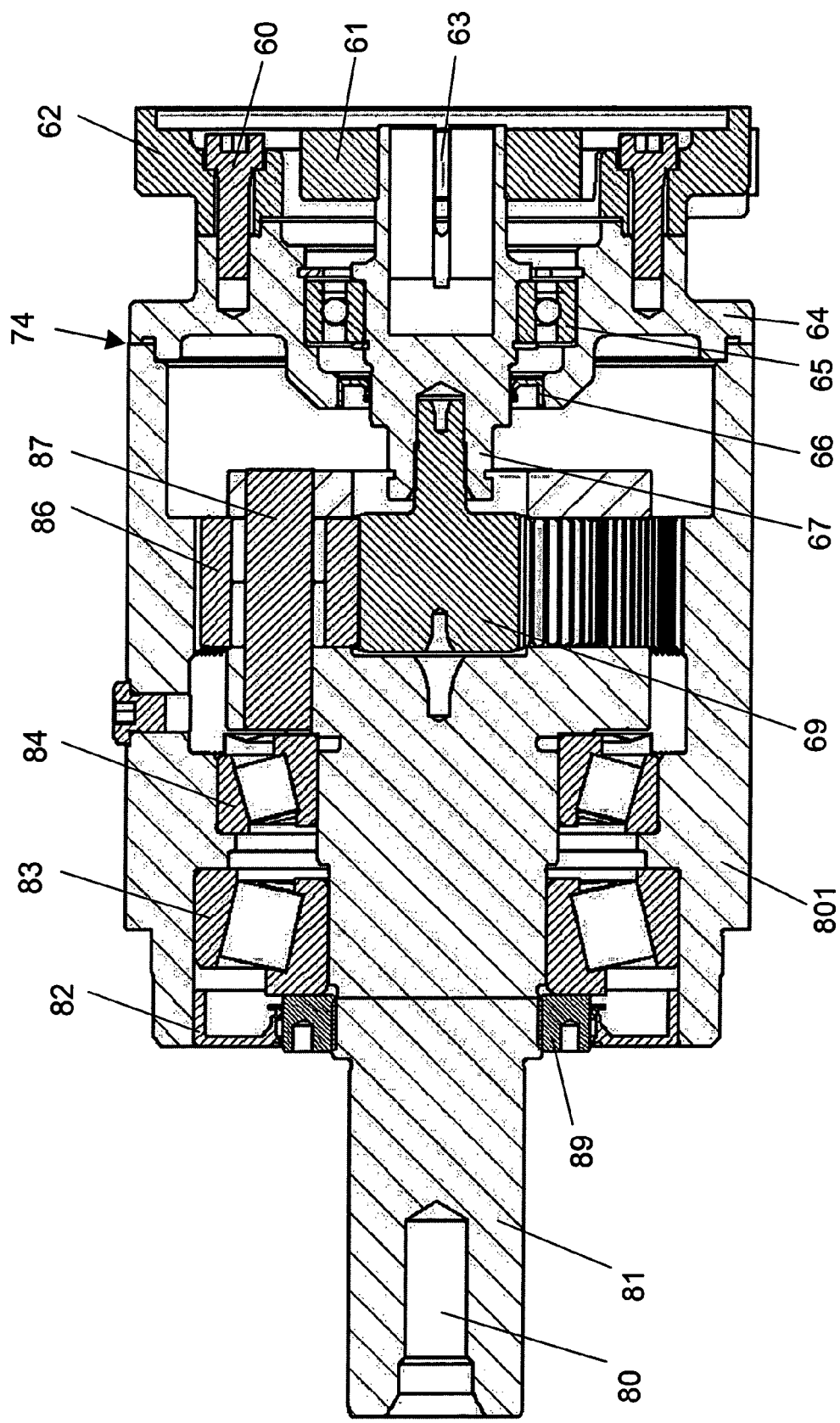
FIG. 12 illustrates a planetary gear unit with an adapter.
Figure 13:
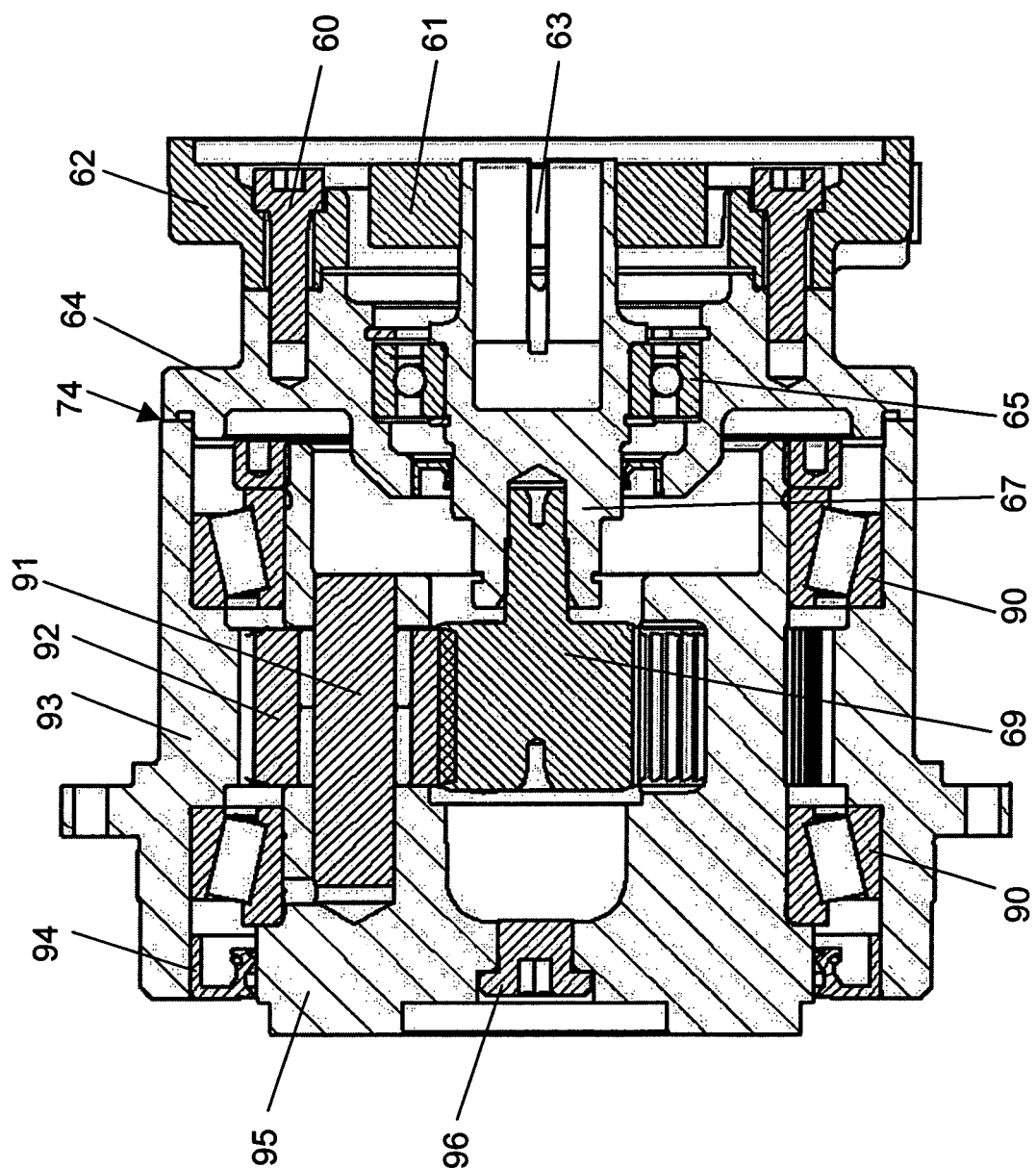
FIG. 13 illustrates a planetary gear unit with an adapter.

To compensate for thermal expansions, compensating disks are inserted as elastic rings in the region of bearing 65. Therefore, thermal expansions may be essentially passed on to shank pinion 69 and are compensated in gear unit 8, 9 or 10, since the sun wheel and planets may be shiftable relative to each other by small amounts without considerable functional losses. To that end, gear unit 8, 9 or 10 makes spatial volume available that is provided axially in front of the upper and behind the lower end face of the sun wheel, as illustrated in FIGS. 12 and 13, as well.

A difference between the adapters illustrated in FIGS. 5 and 6 is that the adapter illustrated in FIG. 5 has two bearings 54, 57 for adapter shaft 52, whereas only one bearing 65 is provided for adapter shaft 67. Bearing 65 is provided as a fixation aid during assembly. Since shank pinion 69 is used as sun wheel, no take-up of lateral force may be necessary. However, the adapter illustrated in FIG. 5 is provided for assembly with the input spur-gear stage of gear unit 7, lateral forces then acting on plug-on pinion 53, which are absorbed by bearings 55, 57.

Figure 7:
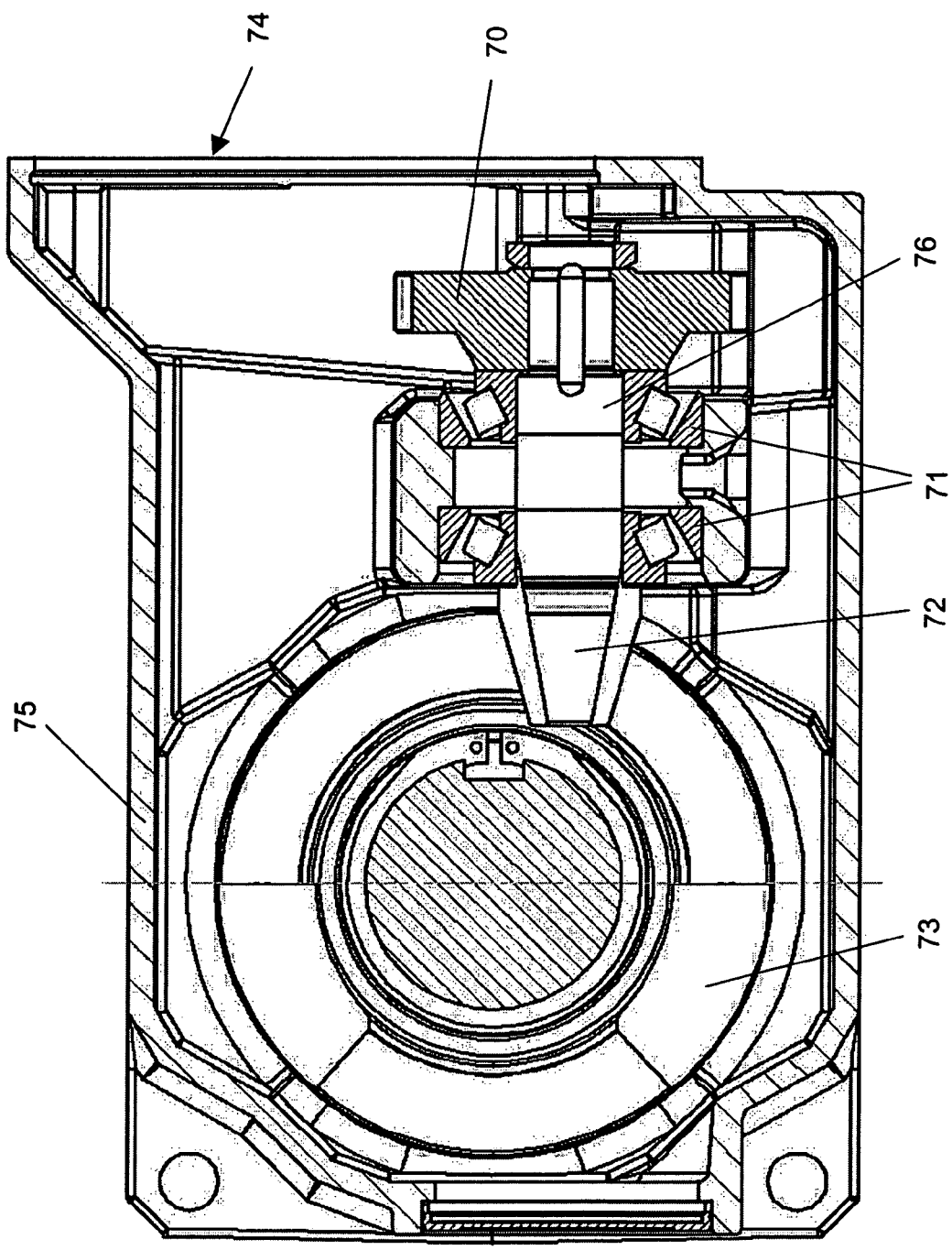
FIG. 7 illustrates right-angle gear unit 7 illustrated in FIG. 1 as an individual part.

FIG. 7 illustrates gear unit 7, thus, the right-angle gear unit, which, toward the motor, has the same interface with open fitting as the planetary gear unit. Therefore, the motor with its motor bearing shield 12 is thus connectable both to right-angle gear unit 7 and to one of planetary gear units 8, 9, 10. FIG. 7 illustrates the interface with open fitting 74 more precisely. The pinion connected to the adapter shaft is inserted into right-angle gear unit 7 until it engages with spur gear 70, and the housing of the adapter part or of motor bearing shield 12 abuts axially against the housing of gear unit 7. Additionally, a relative radial shift of the housing is then carried out such that the desired amount of the backlash of the spur-gear stage of less than 3 angular minutes may be achieved. Finally, the connection is then secured with fastening screws in a manner resistant to fatigue.

Not only the adapter with adapter part 5, but also a direct mounting of the motor with the aid of motor bearing shield 12 may be made possible, the shank pinion or plug-on pinion then being provided directly at the rotor shaft of rotor 3 or 4. Therefore, an extremely compact type of construction may be achieved, which at the same time may be compatible with the standard motor, including rotor shaft 2 with cylindrical shaft end, via the adapter. After the connection of the adapter or motor, spur gear 70 engages with the respective pinion, a backlash of, e.g., less than three angular minutes being provided. Spur gear 70 is connected by feather keys to shaft 76, which also encompasses pinion 72. Shaft 76 and pinion 72 may be designed in one piece. Shaft 76 is supported by bearing 71, which is connected to housing part 75 of gear unit 7. Pinion 72 engages with crown-toothed wheel 73, that is supported by a bearing in housing part 75 of gear unit 7.

Figure 8:
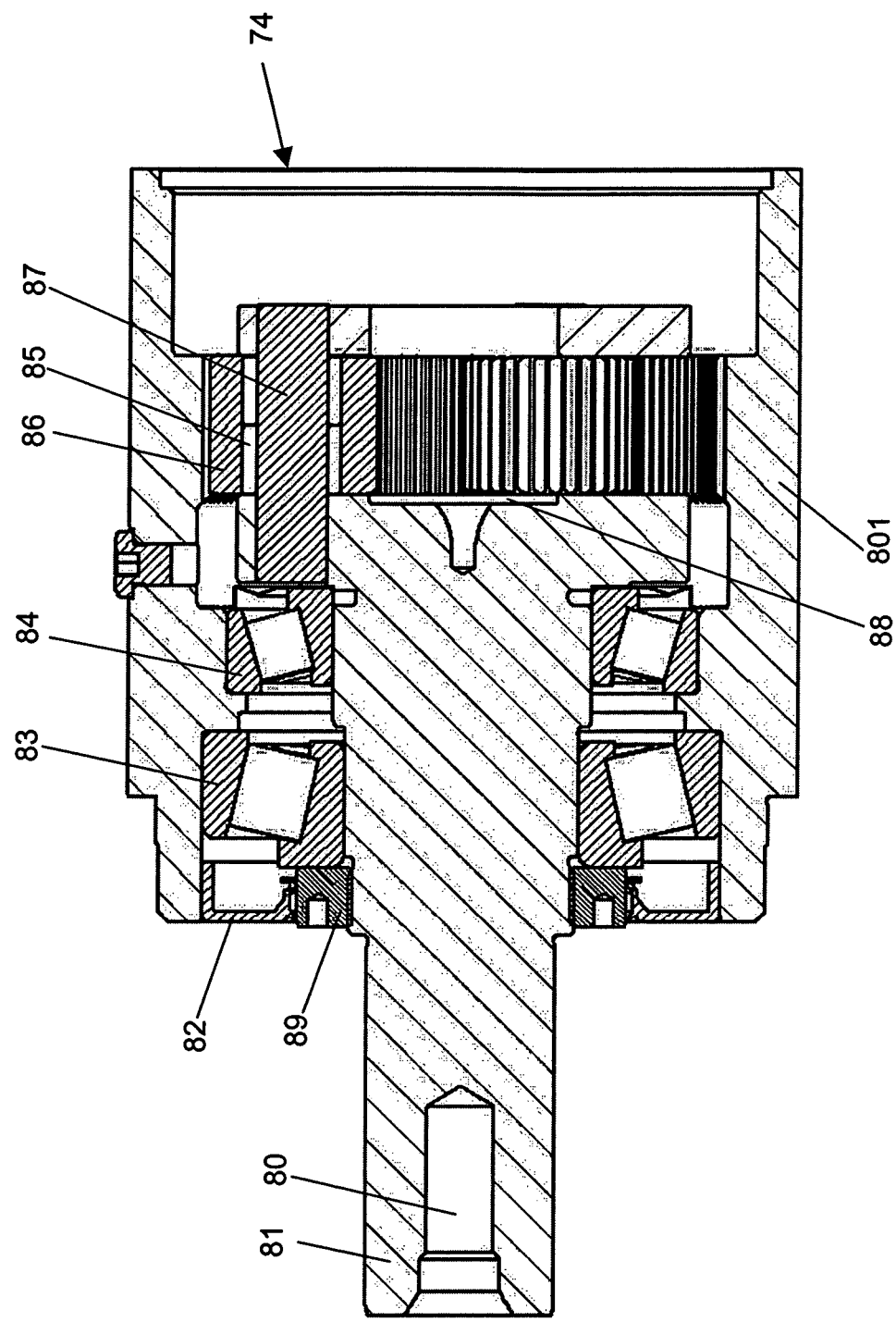
FIGS. 8 and 9 illustrate planetary-gear-unit parts.

In FIG. 8, planetary gear unit 8 is illustrated enlarged as an individual part. The interface toward the motor or adapter is implemented as an open fitting in the manner already mentioned. After the connection, the pinion, thus shank pinion or plug-on pinion, connected to the rotor shaft or adapter shaft acts as the sun wheel of the planetary gear unit. Spatial volume 88 is able to compensate for thermal expansions. The spatial volume may have an axial extension toward the sun wheel, e.g., between 0.2 mm and 2 mm. The sun wheel engages with planet wheels 86 and, upon connection, is essentially codetermined in its position and alignment. Planet wheels 86 are in each case supported via one or even two needle bearings 85, arranged axially behind each other, on planet spindles 87, which are provided in bores of planet-carrier shaft 81, that has a centering bore 80. Planet-carrier shaft 81 is supported by bearings 83, 84 in the housing, and sealed against it by shaft seal ring 82. Clamping nut 89 serves at its outer periphery as a bearing surface for the sealing lip of the shaft seal ring. The housing also features a recess having a screw plug for filling or emptying the lubricant.

Figure 9:
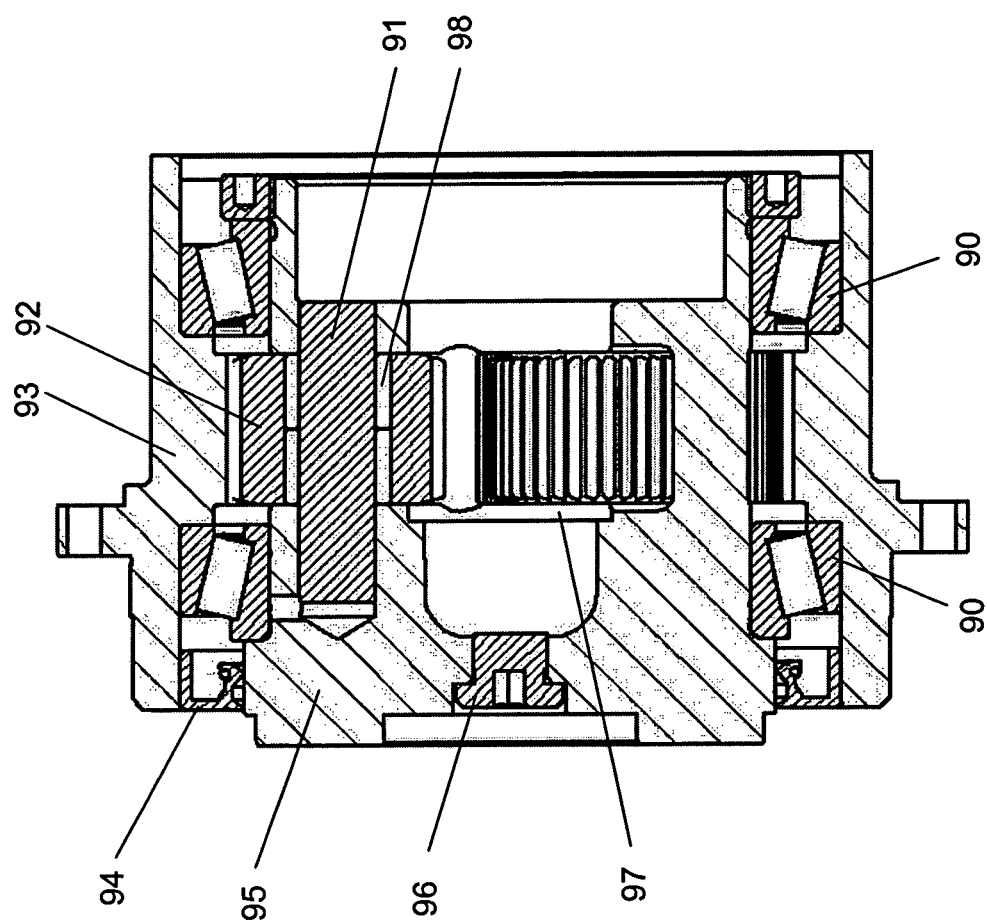

Planetary gear unit 9 is illustrated enlarged as an individual part in FIG. 9, this planetary gear unit having a flange block interface on the output side. This interface may be implemented as an industrial robot interface in accordance with the standard EN ISO 9409-1. The interface toward the motor or adapter is implemented as an open fitting in the manner already mentioned. After the connection, the pinion, thus shank pinion or plug-on pinion, connected to the rotor shaft or adapter shaft acts as the sun wheel of the planetary gear unit. Spatial volume 97 is able to compensate for thermal expansions. The spatial volume may have an axial extension toward the sun wheel, e.g., between 0.2 mm and 2 mm. The sun wheel engages with planet wheels 92 and, upon connection, is essentially codetermined in its position and alignment. Planet wheels 92 are in each case supported via one or even two needle bearings 98, arranged axially behind each other, on planet spindles 91, which are provided in bores of planet-carrier shaft 95, that has a central bore which is tightly closed by a screw plug 96. The indicated bore may be implemented as a threaded bore, and screw plug 96 has a corresponding thread. As illustrated in FIG. 9, screw plug 96 is releasable for filling or emptying the lubricant, and is then connectable again. Planet-carrier shaft 95 is supported by bearing 90 in the housing and sealed against it by shaft seal ring 94, planet carrier 95 being processed in one area at its outer periphery such that the area is usable as a bearing surface for the sealing lip of the shaft seal ring.

Figure 11:
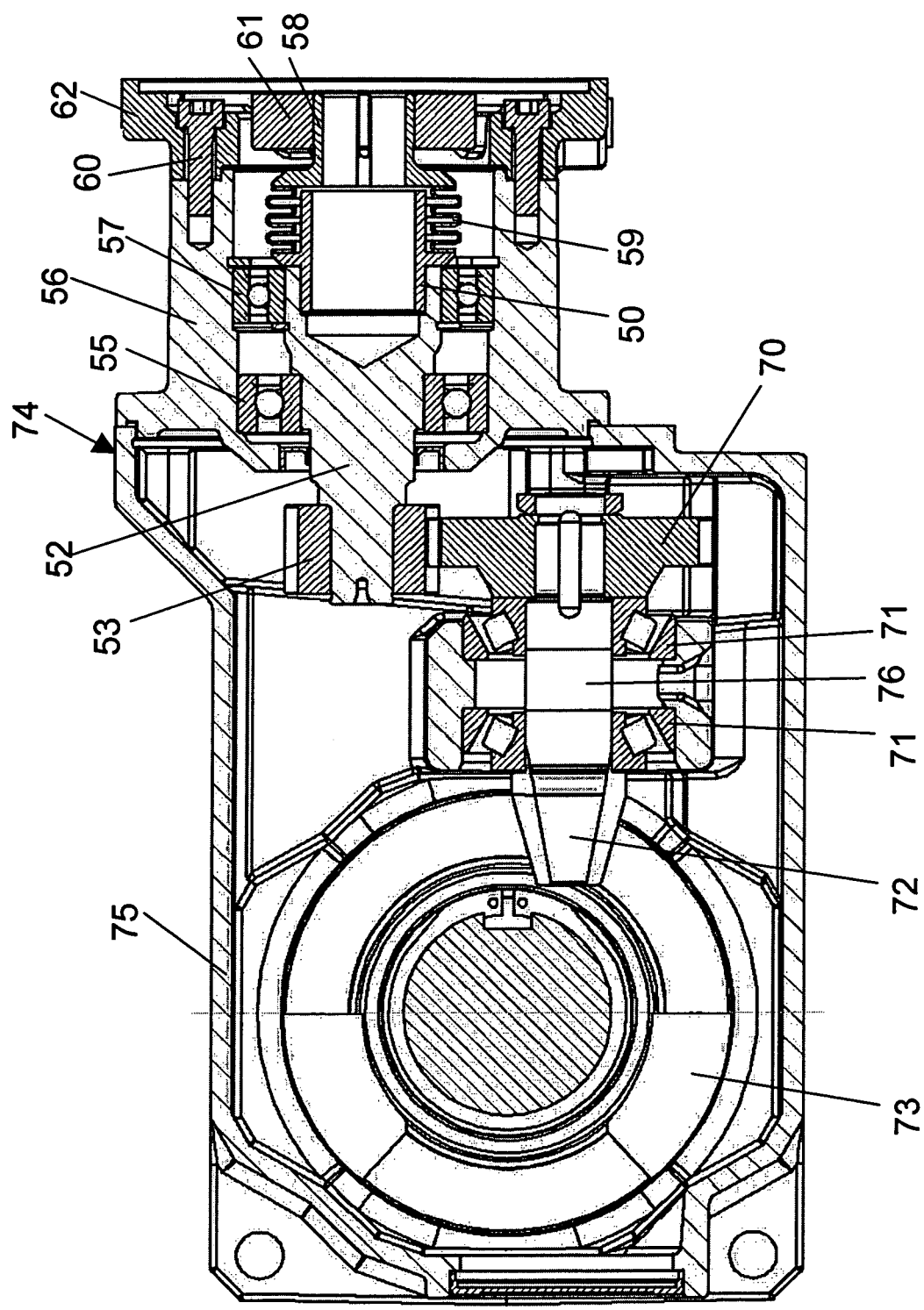
FIG. 11 illustrates a double-stage right-angle gear unit with an adapter.

FIG. 11 illustrates the assembly of right-angle gear unit 7 with adapter part 5 and adapter flange 11, interface 74 being implemented as an open fitting for adjusting the backlash between spur gear 70 and plug-on pinion 53.

FIG. 12 illustrates the assembly of planetary gear unit 8 with adapter part 6 and adapter flange 11, interface 74 being implemented as an open fitting for the compensation of tolerances. In this context, planet wheels 86 essentially codetermine the position and alignment of shank pinion 69 used as sun wheel, e.g., in the radial alignment.

FIG. 13 illustrates the assembly of planetary gear unit 9 with adapter part 6 and adapter flange 11, interface 74 being implemented as an open fitting for the compensation of tolerances. In this context, planet wheels 92 essentially codetermine the position and alignment of shank pinion 69 used as sun wheel, e.g., in the radial alignment.

Thus, a connection of IEC standard motors with the aid of an adapter, or manufacturer-specific motors without adapter, may be provided to a gear unit, the manufacturer-specific motors being designed with a rotor shaft encompassing a shank pinion or plug-on pinion. Therefore, an extremely compact, direct connection to a gear unit may be made possible, which, however, may also be usable with standard motors connectable via adapter.

The adapters may compensate for the thermal linear expansion of the rotor shaft, and therefore the gear unit and the motor may be able to be thermally decoupled by the adapters.

Both single-stage or multi-stage gear units with or without lateral force may be produced on the input side, thus gear units with input helical gear stage or planetary gear stage may be connectable. Depending on the type of gear unit, the adapter may be implemented with lateral-force compensation, thus with adapter part 5, or without lateral-force compensation, thus with adapter part 6. Consequently, a large number of variation possibilities may be provided.

Moreover, the adapter may have the additional function of permitting centering of the pinion upon insertion into the gear unit.

In the case of the open fitting, it may be provided that prior to tightening the fastening screws, radial shifts are permitted between adapter and gear unit which are greater than corresponding shifts between adapter and motor.

Not only the entire right-angle gear unit may have a backlash of less than 3 angular minutes, but also the planetary gear unit and even the double-stage planetary gear unit, which is formed of planetary-gear preliminary stage 10 and planetary gear unit 9 or 8.

The motor with rotor 2 may thus be implemented as a direct-mounting motor (1, 2, 13), and with another motor bearing shield 14, which permits the connection with gear units 127, 128, 129, 130, 131 illustrated in FIG. 10, motor bearing shield 14 being connectable to adapter 126 or to series-connected gear unit 125. As illustrated in FIGS. 1 and 10, an encircled 1 is used for the graphic illustration of this connection possibility.

The encircled 2 reference numeral represents that a direct connection of motor housing 1 together with rotors 3 or 4 to gear units 127, 128, 129, 130, 131 may also be made possible. To that end, motor housing 1 is provided with an interface which corresponds to the interface of the indicated gear units.

Therefore, not only standard gear units 127, 128, 129, 130, 131 are usable for the motor housing, but also servo gear units 7, 8, 9.

The number of parts in the geared motors may be as small as possible, the reuse within the modular system may be as great as possible, and the application variants covered may be as diverse as possible. For example, both servo geared motors and standard geared motors are indicated as variants.

The series may be designed and implemented such that all servo gear units of FIG. 1 have only integral gear ratios.

The same adapter is used in the variants illustrated in FIG. 12 and FIG. 13. However, the planetary gear unit illustrated in FIG. 13 is supported on both sides, the planetary gear unit illustrated in FIG. 12 on one side, e.g., the output side. Therefore, adapter-side bearing 90 needs overall axial length. This overall length is taken into account by the design and overall axial length of adapter shaft 67 together with shank pinion 69 such that the shank pinion as sun wheel is inserted completely between planet wheels 92. The same adapter is provided in FIG. 12. So that shank pinion 69 is completely inserted between planet wheels 92 in this planetary gear unit as well, housing 801 of the planetary gear unit is lengthened such that interface 74, thus, the open fitting, sits at the corresponding axial position relative to the planet wheels, as also in FIG. 13. As illustrated in FIG. 12, an increased air volume is thereby formed between planet-carrier shaft 81 and the open fitting, which contributes to the reduction in air pressure in response to temperature elevation. This reduction in air pressure may be advantageous, e.g., during assembly or in the event of temperature elevations during operation. On the whole, therefore, because of the set goal of the greatest possible number of combinations, an increased overall length is accepted in one variant of the series. An advantage may be the reduction in air pressure in the event of a temperature elevation, viewed relatively with respect to a smaller unit volume of the gear unit. This may be achieved, for example, in the case of servo gear units, since there during a positioning task, high rotational speeds may occur which may lead to corresponding heating. Therefore, in the present series, the indicated increase in overall length is intentionally accepted, to thus attain two advantages, e.g., first, the combination diversity, and secondly, the reduction in air pressure.

In comparison to FIG. 13, the increased air volume may be seen clearly in FIG. 12. If, instead of the adapter, a motor having a drive-end bearing shield is directly attached, the air volume is formed in analogous fashion.

Instead of double-stage right-angle gear unit 7, a single-stage hypoid gear unit may be provided. This may provide that the gear ratio is an integer, even if the efficiency is slightly less.

In the case of the indicated direct mounting, it may be provided that no coupling may be needed, and therefore the number of parts, and thus also the costs may be reduced. In addition, the type of construction may therefore be compact, as well.

As illustrated in FIG. 5, the deformation of the metal bellows compensates for thermal expansions; as illustrated in FIG. 6, the compensation is by displaceable bearing 65.

Right-angle gear unit 7 may be configured such that on the whole, it has an integral gear ratio, e.g., in the range of 3 to 30. To achieve the different gear ratios, the gearing parts are interchanged within one size; in so doing, depending on the desired gear ratio, one set, including a crown-toothed wheel and a hypoid pinion, is exchanged for a second set, including a different crown-toothed wheel and a different hypoid pinion. In addition, the spur gears of the input gear stage are varied such that on the whole, an integral gear ratio may always be present. Given a constant distance between axes, thus within a specific size, the varying of the spur gears includes the helix angle and the profile offset.

For the hypoid stage of right-angle gear unit 7, the first indicated set may be designed for the gear ratio i=3, the second set for the gear ratio i=7.5.

The gear ratios within one size, which, using as few different gearing parts as possible, may cover a range of gear ratios which may be as broad and densely filled as possible, are i=3, 4, 6, 8, 10, 15, 20, 25, 30, 35 and 40. In this context, the gear ratios of i=3 to 10 may be produced by the hypoid set, where i=3, and the remaining gear ratios with the set where i=7.5.

A series may include 6 sizes, thus 6 different distances between axes, for the spur-gear stage of right-angle gear unit 7. All industrially customary sizes or output classes may be covered by this number. In addition, an optimal relationship between parts variety and piece number may be attainable at the same time. In the case of even larger sizes, e.g., in the megawatt range or more, the piece numbers may be small, such that the advantage of the multiple use of parts for different variants may become small, but the conceptual disadvantages may increase, for example, the material quantities, and thus the material costs for the housing, as well.

The sizes may be designed such that the maximally transmittable torque of the sizes is graduated in the manner M1*

($2^{(n-1)}$), n being the size numbered from 1 to 6 and M1 being the maximally transmittable torque of the smallest size, thus for n=1.

Deviations from the indicated formula $M1*(2^{(n-1)})$ may be, if they are less than 18%. This may be a particularly advantageous value.

The value M1=40 Nm may be especially advantageous, since the above-indicated advantageous part of the market for industrial gear units may thus be able to be covered, while retaining the cited advantages.

Values for M1 between 10 Nm and 100 nm may also be advantageous.

The series may include two types of low-backlash gear units, e.g., the indicated gear units with 3 angular minutes, and gear units of the same kind which, however, have 6 angular minutes. Therefore, more cost-effective gear units with 6 angular minutes and corresponding geared motors may also be able to be produced and offered.

What is claimed is:

1. An assembly set for a series of geared motors, comprising:
    gear units driven by electric motors, each electric motor including a motor housing, the motor housing of each electric motor surrounding a rotor including a rotor shaft, and a drive-end motor bearing shield for connection to the motor housing of each electric motor via a motor housing interface and positioned such that the rotor shaft extends through an opening of the drive-end motor bearing shield, the drive-end motor bearing shield having an output side, and including a bearing positioned between the drive-end motor bearing shield and the rotor shaft to support the rotor shaft, at least two different variants of the drive-end motor bearing shield having identically shaped interfaces for removable connectability to the motor housing of each electric motor; wherein
    the assembly set is of a size characterized by at least one of (a) a physical variable, (b) a mechanical variable and (c) a geometrical variable; and
    wherein, for at least a subset of the variables for one size of the assembly set:
        the drive-end motor bearing shield includes an interface on the output side,
        the gear unit is (a) a lateral-force-free gear unit or (b) a gear unit not free of lateral force, and is directly connectible to the interface,
        an output side of the rotor shaft is connectable to a pinion non-positively, integrally, or positively, and
        the pinion is an input gear of the gear unit.

2. The assembly set according to claim 1, wherein the at least one of (a) the physical variable, (b) the mechanical variable and (c) the geometrical variable includes at least one of (a) rated power output, (b) shaft height and (c) torque.

3. The assembly set according to claim 1, wherein, for a given motor housing, the rotor shaft is a first type, having a plug-on pinion on the output side, or a second type, having a shank pinion on the output side.

4. An assembly set for a series of geared motors, comprising:
    gear units driven by electric motors, each electric motor including a motor housing, the motor housing of each electric motor surrounding a rotor including a rotor shaft, and a drive-end motor bearing shield for connection to the motor housing of each electric motor via a motor housing interface and positioned such that the rotor shaft extends through an opening of the drive-end motor bearing shield, the drive-end motor bearing shield having an output side, and including a bearing positioned between the drive-end motor bearing shield and the rotor shaft to support the rotor shaft, at least two different variants of the drive-end motor bearing shield having identically shaped interfaces for removable connectability to the motor housing of each electric motor; wherein
    the assembly set is of a size characterized by at least one of (a) a physical variable, (b) a mechanical variable and (c) a geometrical variable; and
    wherein, for at least a subset of the variables for one size of the assembly set:
        the drive-end motor bearing shield includes an interface on the output side,
        the gear unit is (a) a lateral-force-free gear unit or (b) a gear unit not free of lateral force, and is directly connectible to the interface,
        an output side of the rotor shaft includes a gearing, and the rotor shaft provides an input gear of the gear unit.

5. The assembly set according to claim 4, wherein the at least one of (a) the physical variable, (b) the mechanical variable and (c) the geometrical variable includes at least one of (a) rated power output, (b) shaft height, and (c) torque.

6. An assembly set for a series of gear motors, comprising:
    gear units driven by electric motors, each electric motor including a motor housing, the motor housing of each electric motor surrounding a rotor including a rotor shaft, and a drive-end motor bearing shield for connection to the motor housing of each electric motor via a motor housing interface and positioned such that the rotor shaft extends through an opening of the drive-end motor bearing shield, the drive-end motor bearing shield having an output side, and including a bearing positioned between the drive-end motor bearing shield and the rotor shaft to support the rotor shaft; wherein
    the assembly set is of a size characterized by at least one of (a) a physical variable, (b) a mechanical variable and (c) a geometrical variable; and
    wherein, within one size, the motor housing includes an interface to an output-side motor bearing shield, at least two different variants of the output-side motor bearing shield having identically shaped interfaces for removable connectability to the motor housing of each electric motor;
    wherein, in a first variant, the drive-end motor bearing shield includes an interface on the output side to connect the drive-end motor bearing shield to an adapter flange of an adapter, the adapter including a first adapter part and the adapter flange, the assembly set including at least two types of the first adapter part connectible to the adapter flange, the interface between the adapter flange and the drive-end motor bearing shield of the first variant including a centering device, the first adapter part of a first type: (a) connectible to a gear unit not free of a lateral force with an interface encompassing a two-dimensional, open fitting that permits shifts in a plane to set a backlash of the gear unit not free of the lateral force; (b) including an adapter shaft; (c) including at least two bearings; and (d) including a first device for compensation of axial expansions, the first adapter part of a second type: (a) connectible by an interface to a lateral-force-free gear unit; (b) including an adapter shaft; (c) including a second device for compensation of axial expansions; and (d) including one bearing;
    wherein, in a second variant, the drive-end motor bearing shield includes an interface on the output side, a lateral-force-free gear unit and a gear unit not free of lateral force selectively directly connectible to the interface, in the second variant, with a same motor housing, at least two types of rotor shafts providable, a first type of the rotor shaft including a plug-on pinion on an output side, the plug-on pinion meshable with at least one gearing part of the gear unit, a second type of the rotor shaft including a shank pinion on the output side, the shank pinion meshable with at least one gearing part of the gear unit.

7. The assembly set according to claim 6, wherein the at least one of (a) the physical variable, (b) the mechanical variable and (c) the geometrical variable-includes at least one of (a) rated power output, (b) shaft height and (c) torque.

8. The assembly set according to claim 6, wherein the centering device includes a fitting.

9. The assembly set according to claim 6, wherein the gear unit not free from the lateral force includes a gear unit with a helical-gear stage arranged on an input side.

10. The assembly set according to claim 6, wherein the first device for compensation of axial expansions is adapted for compensation of thermally caused expansions.

11. The assembly set according to claim 6, wherein the lateral-force-free gear unit includes a planetary gear unit.

12. The assembly set according to claim 6, wherein the second device for compensation of axial expansions is adapted for compensation of thermally caused expansions.

13. The assembly set according to claim 6, wherein the gear units include an open fitting as an interface on an input side.

14. The assembly set according to claim 6, wherein the first device for compensation of axial expansions includes a bellows coupling.

15. The assembly set according to claim 6, wherein the second device for compensation of axial expansions includes a compensation disk.

16. The assembly set according to claim 6, wherein the second device for compensation of axial expansions includes a compensation disk at a bearing end of the adapter part.

17. The assembly set according to claim 6, wherein the gear units include low-backlash units, wherein the backlash on the gear units is less than three angular minutes per individual gear stage and/or gear unit.

18. The assembly set according to claim 6, wherein the gear units include low-backlash units adjustable to less than one of (a) six and (b) three angular minutes per individual at least one of (a) gear stage and (b) gear unit.

19. The assembly set according to claim 6, wherein a lateral-force-free gear unit supported on the output side and connected to one of (a) the adapter part and (b) the drive-end motor bearing shield encompasses a higher air volume for pressure equalization than a lateral-force-free gear unit supported on both the output and input sides and directly connected to one of (a) the adapter part and (b) the drive-end motor bearing shield.

20. The assembly set according to claim 6, wherein the gear unit includes a planetary gear stage as an input stage.

21. The assembly set according to claim 6, wherein the gear unit not free of lateral force includes a double-stage gear unit having a spur-gear stage on an input side.

22. The assembly set according to claim 6, wherein the gear unit not free of lateral force includes a double-stage gear unit having a spur-gear stage on an input side having helical-toothed gear wheels.

23. The assembly set according to claim 6, wherein a second stage of the gear unit not free of lateral load includes a right-angle gear stage.

24. The assembly set according to claim 23, wherein the right-angle gear stage is a single-stage gear stage.

25. The assembly set according to claim 23, wherein the right-angle gear stage includes a hypoid gear unit.

26. The assembly set according to claim 6, wherein the gear units include servo gear units.

27. The assembly set according to claim 6, wherein, in a third variant, the drive-end motor bearing shield includes an interface on an output side, a standard gear unit connectible to the interface.

28. The assembly set according to claim 27, wherein the standard gear unit includes one of (a) a helical gear unit, (b) a parallel-shaft gear unit, (c) a bevel gear unit and (d) a worm gear unit.

29. The assembly set according to claim 6, wherein, in the first variant, the drive-end motor bearing shield includes an interface on the output side, one of (a) a series-connected gear unit and (b) an adapter connectible to the interface, the one of (a) the series-connected gear unit and (b) the adapter connectable to a standard gear unit.

30. The assembly set according to claim 29, wherein the standard gear unit includes one of (a) a helical gear unit, (b) a parallel-shaft gear unit, (c) a bevel gear unit and (d) a worm gear unit.

31. The assembly set according to claim 6, wherein one of (a) the interface between the motor bearing shield and the adapter flange and (b) the interface between the adapter part and the gear unit is in the form of one of (a) a square flange and (b) a round flange.

32. The assembly set according to claim 6, wherein at least one gear unit includes a cylindrical shaft end on an output side.

33. The assembly set according to claim 6, wherein at least one gear unit includes a flange block interface on an output side.

34. The assembly set according to claim 6, wherein a right-angle gear unit includes an input spur-gear stage and at least one right-angle gear stage, the right-angle gear unit including an integer gear ratio.

35. The assembly set according to claim 34, wherein, within one size, a first set including a wheel and pinion is exchangeable for a second set including a different wheel and a different pinion.

36. The assembly set according to claim 35, wherein at least one of (a) at least one wheel includes a crown-toothed wheel and (b) at least one pinion includes a hypoid pinion.

37. The assembly set according to claim 35, wherein gear ratios of the sets include 1:2.5.

38. The assembly set according to claim 35, wherein a gear ratio of the first set is 3.

39. The assembly set according to claim 34, wherein the right-angle gear stage includes an axial offset.

40. An assembly set for a series of geared motors, comprising:
gear units driven by electric motors, the electric motors including a motor housing, a rotor including a rotor shaft, and a drive-end motor bearing shield, the drive-end motor bearing shield having an output side, and including a bearing positioned between the drive-end motor bearing shield and the rotor shaft to support the rotor shaft, at least two different variants of the drive-end motor bearing shield having identically shaped interfaces for removable connectability to the motor housing of the electric motors; wherein
the assembly set is of a size characterized by at least one of (a) a physical variable, (b) a mechanical variable and (c) a geometrical variable; and
wherein, for at least a subset of the variables for one size of the assembly set:

the drive-end motor bearing shield includes an interface on the output side,
the gear unit is (a) a lateral-force-free gear unit or (b) a gear unit not free of lateral force, and is directly connectible to the interface,
an output side of the rotor shaft is connectable to a pinion non-positively, integrally, or positively, and
the pinion is an input gear of the gear unit.

* * * * *